United States Patent
Zhang et al.

(10) Patent No.: US 8,483,634 B1
(45) Date of Patent: *Jul. 9, 2013

(54) SYSTEM FOR SIGNAL METRIC BASED RECEIVE SELECTION

(75) Inventors: Hongyuan Zhang, San Jose, CA (US); Zhiyu Yang, Sunnyvale, CA (US); Kedar Shirali, San Jose, CA (US); Atul Salhotra, Sunnyvale, CA (US)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,887

(22) Filed: Jul. 16, 2012

Related U.S. Application Data (63) Continuation of application No. 11/999,482, filed on Dec. 5, 2007, now Pat. No. 8,224,272.

(60) Provisional application No. 60/870,242, filed on Dec. 15, 2006.

(51) Int. Cl.
 *H04B 17/02* (2006.01)
 *H04B 1/16* (2006.01)

(52) U.S. Cl.
 USPC ......... 455/133; 455/137; 455/227; 455/452.2

(58) Field of Classification Search
 USPC .............. 455/133–135, 450–452.2, 512–513, 455/59–62, 115.3, 226.2, 226.3, 67.13, 137, 455/227; 370/445, 450, 461, 462, 458, 459, 370/338, 447, 443, 44, 328
 See application file for complete search history.

(56) References Cited

U.S. PATENT DOCUMENTS

| | | | | |
|---|---|---|---|---|
| 5,506,863 A * | 4/1996 | Meidan et al. | | 375/134 |
| 5,940,435 A * | 8/1999 | Hendrickson | | 375/147 |
| 6,115,390 A * | 9/2000 | Chuah | | 370/443 |
| 6,594,265 B1 * | 7/2003 | Etorre et al. | | 370/395.51 |
| 6,608,832 B2 * | 8/2003 | Forslow | | 370/353 |
| 7,013,338 B1 * | 3/2006 | Nag et al. | | 709/226 |
| 7,103,316 B1 * | 9/2006 | Hall | | 455/63.1 |
| 7,228,113 B1 * | 6/2007 | Tang et al. | | 455/101 |
| 7,477,656 B2 * | 1/2009 | Tagawa | | 370/465 |
| 7,643,509 B2 * | 1/2010 | Han et al. | | 370/445 |
| 7,756,158 B2 * | 7/2010 | Kai | | 370/469 |

(Continued)

OTHER PUBLICATIONS

Part 11: Wireless LAN Medium Access Control (MAC) and Physical Layer (PHY) Specifications: Amendment 2: Higher-Speed Physical Layer (PHY) Extension in the 2.4 GHz Band-Corrigendum 1; IEEE Std. 802.11b-1999/Cor 1-2001.

(Continued)

*Primary Examiner* — Pablo Tran (57) ABSTRACT

A wireless networking receiver with digital antenna switching selects an antenna with an 802.11b signal based on a signal metric, such as the highest signal quality or highest peak amplitude. In one embodiment, the receiver comprises a plurality of antennas that may each receive one of a plurality of RF signals conforming to the IEEE 802.11b standard. The receiver may have multiple antennas for use with the IEEE 802.11n standard, but may receive signals conforming to the 802.11b standard. The receiver also comprises a carrier sense circuit configured to calculate a signal metric for each of the signals and further configured to generate a selection signal signifying one of the signals, based on the signal metric. The receiver further comprises a multiplexer configured to output one of the signals, based on the selection signal.

20 Claims, 9 Drawing Sheets

U.S. PATENT DOCUMENTS

| | | | | |
|---|---|---|---|---|
| 7,756,656 | B2 | 7/2010 | Asano | |
| 7,830,917 | B2* | 11/2010 | Sato | 370/469 |
| 2005/0259676 | A1* | 11/2005 | Hwang | 370/436 |
| 2007/0047461 | A1* | 3/2007 | Seo et al. | 370/252 |
| 2009/0252053 | A1* | 10/2009 | Leith et al. | 370/252 |
| 2010/0027558 | A1* | 2/2010 | Han et al. | 370/445 |
| 2010/0142375 | A1* | 6/2010 | Portoles Comeras et al. | 370/235 |
| 2011/0075578 | A1* | 3/2011 | Kim et al. | 370/252 |

OTHER PUBLICATIONS

Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band; IEEE Std. 802.11g/D8.2 Apr. 2003.

Mujtaba, Syed Aon, "TGn Sync Proposal Technical Specification": IEEE Std. P802,11-04/0889r6 May 18, 2005.

Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-Speed Physical Layer in the 5 Ghz Band. IEEE Std. 11a-1999.

Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: High-Speed Physical Layer Extension in the 2.4 GHz Band. IEEE Std. 11b-1999.

* cited by examiner

SYSTEM FOR SIGNAL METRIC BASED RECEIVE SELECTION

CROSS-REFERENCE TO RELATED APPLICATION

This application is a continuation application of U.S. Non-Provisional application Ser. No. 11/999,482, filed Dec. 4, 2007 (now U.S. Pat. No. 8,224,272), which claims the benefit of U.S. Provisional Application No. 60/870,242, filed Dec. 15, 2006. The contents of U.S. Non-Provisional application Ser. No. 11/999,482 and U.S. Provisional Application No. 60/870,242 are hereby incorporated by reference in their entirety.

TECHNICAL FIELD

The invention relates to wireless networking. More particularly, the invention relates to selection of a wireless networking signal from among multiple wireless networking signals.

BACKGROUND

Wireless networking standards may be defined with varying data rates, modulation techniques, frequencies, number of antennas, and other parameters. A newer standard is often backward compatible with older standards so that existing equipment designed for use with older standards may still be used with equipment deploying the newer standard. For example, the older IEEE 802.11b standard defines operation in the 2.4 GHz band at data rates of 1, 2, 5.5, and 11 Mbps using a single antenna. The digital modulation scheme varies with the data rate in the 802.11b standard. The modulation scheme used at 1 Mbps or 2 Mbps is a direct-sequence spread spectrum scheme (DSSS), which includes phase shift keying (PSK) and differential phase shift keying (DPSK), while at 5.5 Mbps or 11 Mbps, a complementary code keying scheme (CCK) may be used. On the other hand, the newer IEEE 802.11n standard defines operation in the 2.4 or 5 GHz bands at multiple data rates up to a maximum of 600 Mbps using multiple antennas in a spatial multiplexing approach, known as a multiple input, multiple output scheme (MIMO). The 802.11n standard may use the DSSS, PSK, DPSK, and CCK modulation schemes to maintain backward compatibility, and may also use additional modulation schemes, such as orthogonal frequency division multiplexing (OFDM) and quadrature amplitude modulation (QAM). Other wireless networking standards exist, such as 802.11a and 802.11g, which may have other data rates, modulation techniques, frequencies, and other parameters.

Wireless networking equipment using the 802.11b standard may operate in environments with wireless networking equipment using the 802.11n standard. For example, a receiver with multiple antennas designed primarily for use with the 802.11n standard may receive a radio frequency (RF) signal conforming to the 802.11b standard. If an 802.11n signal is received by the 802.11n receiver, each antenna may receive a unique stream of data packets, as defined by the 802.11n standard, to take advantage of the multiple antennas. However, if an 802.11b signal is received by an 802.11n receiver, each antenna receives an 802.11b signal with the same data packets on each signal, because the 802.11b standard does not define the use of multiple antennas. In this situation, the received 802.11b signals may be of differing qualities on one antenna compared to another antenna, due to the effects of multipath delay, interference, and other factors.

Existing 802.11n receivers receiving an 802.11b signal may randomly select an antenna to use or may be restricted to using one antenna for processing 802.11b signals, which may result in the use of a lower quality signal. If a lower quality signal is used, the performance of the wireless network and/or the equipment may decrease. In addition, an 802.11n receiver receiving an 802.11b signal may use conventional antenna selection in the RF domain to select an antenna out of the multiple antennas, but such receivers may be slower and put an increased hardware burden on the receiver. Therefore, there is a need for fast intelligent selection of an 802.11b signal in a wireless networking receiver with multiple antennas.

SUMMARY

The present invention is defined by the following claims, and nothing in this section should be taken as a limitation on those claims.

By way of introduction, the embodiments described below provide a wireless networking receiver with digital antenna switching to select an antenna with an 802.11b signal that has a signal metric, such as the highest signal quality or highest peak amplitude. In one embodiment, the receiver comprises a plurality of antennas that may each receive one of a plurality of RF signals. The receiver may have multiple antennas that are intended for use with the IEEE 802.11n standard, but may receive signals conforming to the 802.11b standard. The receiver also comprises a carrier sense circuit configured to calculate a signal metric for each of the signals, and further configured to generate a selection signal signifying one of the signals, based on the signal metric. The receiver further comprises a multiplexer configured to output one of the signals, based on the selection signal. A related method is also disclosed.

In another embodiment, a wireless networking receiver comprises signal receiving means for receiving a plurality of RF signals, carrier sensing means for calculating a signal metric for each of the plurality of RF signals and generating, based on the signal metric, a selection signal signifying one of the plurality of RF signals, and multiplexer means to output the one of the plurality of received RF signals, based on the selection signal. Each of the plurality of RF signals comprises an RF signal in a 2.4 GHz frequency band operating at a data rate of approximately 1, 2, 5.5, or 11 megabits per second. The signal metric may comprise a signal quality and the carrier sensing means may also operate to generate the selection signal signifying the one of the plurality of received RF signals with a highest signal quality. The signal quality may comprise a measurement of a peak magnitude and a delay dispersion, and the highest signal quality may comprise a highest ratio of a peak magnitude over delay dispersions. The signal metric may alternately comprise a peak magnitude, and the carrier sensing means may operate to generate the selection signal signifying the one of the plurality of received RF signals with a highest peak magnitude. The carrier sensing means may comprise signal metric calculating means for calculating the signal metric for each of the plurality of received RF signals, and comparison means for comparing the signal metric for each of the plurality of received RF signals and generating, based on the comparison, the selection signal signifying one of the received RF signals. The plurality of RF signals may comprise signals conforming to IEEE 802.11b, and the embodiment may comprise signal detecting means for detecting from the plurality of received RF signals a signal conforming to IEEE 802.11b and generating a detection signal denoting a presence of the signal conforming to IEEE 802.11b in the plurality of received RF signals. The detection signal may be used to latch the selection signal. The plurality of RF signals may comprise signals modulated using a complementary code keying scheme, phase shift keying scheme, or a differential phase shift keying scheme.

In another embodiment, a computer readable medium is encoded with computer executable instructions comprising receiving a plurality of RF signals, where each of the plurality of RF signals comprises an RF signal in a 2.4 GHz frequency band operating at a data rate of approximately 1, 2, 5.5, or 11 megabits per second; calculating a signal metric for each of the plurality of received RF signals; generating, based on the signal metric, a selection signal signifying one of the plurality of received RF signals; and outputting the one of the plurality of received RF signals, based on the selection signal. The signal metric may comprise a signal quality and the instructions may comprise generating the selection signal signifying the one of the plurality of received RF signals with a highest signal quality. The signal quality may comprise a measurement of a peak magnitude and a delay dispersion, and the highest signal quality may comprise a highest ratio of a peak magnitude over delay dispersions. The signal metric may alternately comprise a peak magnitude, and the instructions may comprise generating the selection signal signifying the one of the plurality of received RF signals with a highest peak magnitude. The instructions may also comprise comparing the signal metric for each of the plurality of received RF signals, and generating the selection signal signifying one of the received RF signals, based on the comparison. The plurality of RF signals may comprise signals conforming to IEEE 802.11b, and the instructions may comprise detecting from the plurality of received RF signals a signal conforming to the IEEE 802.11b standard, and generating a detection signal denoting the presence in the plurality of received RF signals of the signal conforming to IEEE 802.11b. The instructions may also comprise latching the selection signal when the detection signal is generated. The plurality of RF signals may comprise signals modulated using a complementary code keying scheme, phase shift keying scheme, or a differential phase shift keying scheme.

Each of the embodiments described herein can be used alone or in combination with one another. The embodiments will now be described with reference to the attached drawings.

BRIEF DESCRIPTION OF THE DRAWINGS

FIG. 6($a$) is a functional block diagram of a hard disk drive.

FIG. 6($b$) is a functional block diagram of a digital versatile disk (DVD).

FIG. 6($c$) is a functional block diagram of a high definition television.

FIG. 6($d$) is a functional block diagram of a vehicle control system.

FIG. 6($e$) is a functional block diagram of a cellular phone.

FIG. 6($f$) is a functional block diagram of a set top box.

FIG. 6($g$) is a functional block diagram of a media player.

FIG. 6($h$) is a functional block diagram of a VoIP phone.

DETAILED DESCRIPTION

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

By way of overview, the embodiments described herein are related to wireless networking receivers and a method of selecting a radio frequency (RF) signal. In the disclosed embodiments, a plurality of antennas may each receive one of a plurality of RF signals conforming to the IEEE 802.11b standard. The plurality of RF signals may contain the same data packets but each signal may vary in quality or other parameters. The RF signals may have characteristics that can be measured by calculating signal metrics. The signal metrics may vary depending on factors such as interference, signal attenuation, and multipath delay, also known as delay dispersion. The signal metrics may be used to determine which of the antennas to use for reception of the 802.11b RF signals, for example, by using the antenna which has the signal with the highest signal quality or the highest peak magnitude. The receiver may select the received signal with the signal metric and further process that signal.

Figure 1:
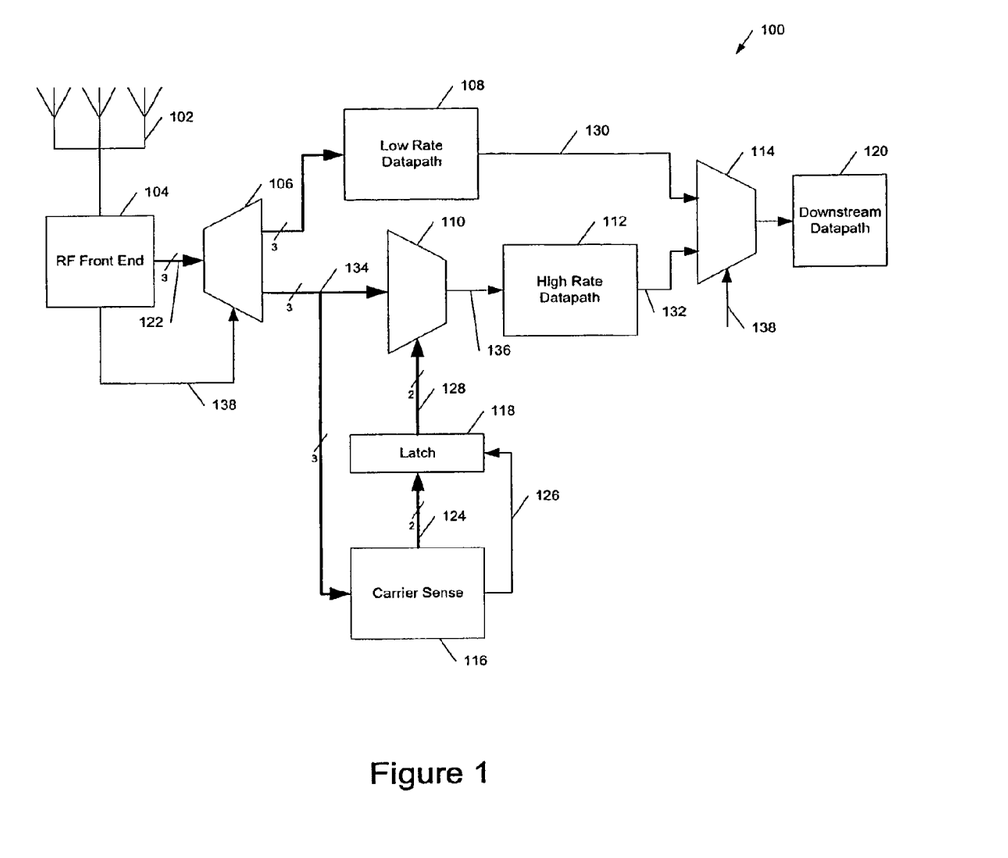
FIG. 1 is a block diagram of a portion of an embodiment of a wireless networking receiver.

FIG. 1 is a block diagram of a portion of an embodiment of a wireless networking receiver 100. The receiver 100 may include a plurality of antennas 102, a RF front end 104, a demultiplexer 106, a low rate datapath 108, a first multiplexer 110, a high rate datapath 112, a second multiplexer 114, a carrier sense circuit 116, a latch 118, and a downstream datapath 120. Other components may be included in the receiver 100. The receiver 100 may receive a plurality of RF signals conforming to the 802.11b standard on the antennas 102. For example, the receiver 100 may have multiple antennas, as defined for use in the 802.11n standard, but still receive 802.11b signals on the multiple antennas. The RF signals may be processed by the RF front end 104, which may include conversion of the RF signals to digital signals 122. The RF front end 104 may also detect the data rate of the RF signals, for example, by reading the preamble of the 802.11b data packets and providing a data rate signal 138. In FIG. 1, the digitized RF signals 122 comprise three independent RF signals. In the case of a received RF signal conforming to the 802.11b standard, each of the three RF signals includes the same data packets with the same data rate, but each signal may differ in signal quality or other parameters.

The detected data rate of the digitized RF signals 122 may determine which datapath the RF signals will be routed through. The demultiplexer 106 and second multiplexer 114 may use the data rate signal 138 to select the routing of the digitized RF signals 122. For example, if the detected data rate is 1 Mbps or 2 Mbps, the demultiplexer 106 may route the digitized RF signals 122 through the low rate datapath 108, and the second multiplexer 114 may route a low rate processed signal 130 to the downstream datapath 120. Similarly, if the detected data rate is 5.5 Mbps or 11 Mbps, the demultiplexer 106 may route the digitized RF signals 122 through the first multiplexer 110, high rate datapath 112, carrier sense circuit 116, and latch 118, followed by the second multiplexer 114 routing the high rate processed signal 132 to the downstream datapath 120.

The three independent RF signals comprising the digitized RF signals 122 are provided to the demultiplexer 106. As discussed above, if the detected data rate is detected as 1 Mbps or 2 Mbps, then the received signals are processed in the low rate datapath 108 to produce the low rate processed signal 130. However, if the detected data rate is detected as 5.5 Mbps or 11 Mbps, then the demultiplexer 106 routes the digitized RF signals 122 to high rate signals 134. The high rate signals 134 are provided to the first multiplexer 110 and the carrier sense circuit 116. One of the high rate signals 134 may be selected by the first multiplexer 110 and processed in the high rate datapath 112. A latched selection signal 128 determines which one of the high rate signals 134 is selected. The latched selection signal 128 may depend on a signal metric calculated in the carrier sense circuit 116. The signal metric that is used may be a calculated signal quality, a peak magnitude, a signal to noise ratio, a frame error rate, or another metric.

The carrier sense circuit 116 may calculate a signal metric for each of the high rate signals 134. Using these signal metrics, the carrier sense circuit 116 may compare the individual signal metrics to find the best signal metric and then generate a selection signal 124 signifying the corresponding high rate signal 134 with the best signal metric. For example, the best signal metric may be the highest signal quality, the highest peak magnitude, the highest signal to noise ratio, the lowest frame error rate, or another measure of a metric. In FIG. 1, the selection signal 124 comprises a width of two bits if there are three independent RF signals in the high rate signals 134. The high rate signals 134 may comprise other numbers of independent RF signals and the selection signal 124 may be the appropriate bit width.

The carrier sense circuit 116 may also detect whether the high rate signals 134 conform to the IEEE 802.11b standard to generate a detection signal 126. The detection signal 126 may be used to latch the selection signal 124 in the latch 118 when an 802.11b signal is detected. The latch 118 may comprise a latch, flip-flop, register, or other data storage device to store the selection signal 124 based on the detection signal 126. The latch 118 may output the latched selection signal 128 to the first multiplexer 110, which may use the latched selection signal 128 to route the high rate signal 134 that has the best signal metric to a best signal 136. The best signal 136 may then be provided to the high rate datapath 112 for processing. While this embodiment describes processing of 5.5 Mbps or 11 Mbps received RF signals in the high rate datapath 112, other embodiments may include processing 1 Mbps or 2 Mbps received RF signals in a similar fashion to determine the RF signal with the best signal metric.

Figure 2:
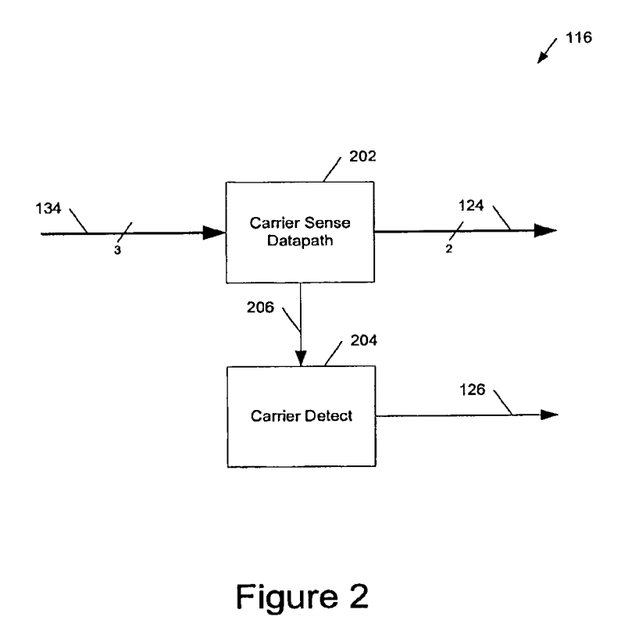
FIG. 2 is a block diagram of a carrier sense circuit of an embodiment of the wireless networking receiver of FIG. 1.

FIG. 2 is a block diagram of a carrier sense circuit 116 of an embodiment of the wireless networking receiver 100. The carrier sense circuit 116 may include a carrier sense datapath 202 and carrier detect circuit 204. The carrier sense datapath 202 may include the high rate signals 134 as inputs and the selection signal 124 as an output. The carrier detect circuit 204 may include a received signal 206 as an input and the detection signal 126 as an output. Additional or different components may also be included in the carrier sense circuit 116. The carrier sense circuit 116, as described above, may calculate a signal metric for each of the high rate signals 134, compare the signal metrics, and generate the selection signal 124 denoting the corresponding high rate signal 134 with the best signal metric. The carrier sense circuit 116 may also detect when the high rate signals 134 conform to the IEEE 802.11b standard and then generate a detection signal 126.

The carrier sense datapath 202 may include logic to calculate a signal metric for each of the high rate signals 134. The calculated signal metrics may also be compared in the carrier sense datapath 202 to find the best signal metric. The best signal metric may be the highest signal quality, the highest peak magnitude, or another measure of a metric. The one signal of the high rate signals 134 that corresponds to the best metric is selected by the carrier sense datapath 202 and the selection signal 124 is encoded to denote that high rate signal. For example, if the second signal of the high rate signals 134 is found to have the best signal metric, the selection signal 124 may comprise the two bits "01". Other encodings of the selection signal 124 may be used to denote which of the high rate signals 134 has the best metric. The selection signal 124 is output from the carrier sense datapath 202 and may be provided to the latch 118.

The carrier sense datapath 202 may also provide the received signal 206 to the carrier detect circuit 204. The received signal 206 may include the signal from any of the high rate signals 134 and may be used by the carrier detect circuit 204 to detect whether the received signal 206 conforms to the IEEE 802.11b standard. The carrier detect circuit 204 may examine the preamble of the received signal 206 or use other methods to determine whether the received signal 206 conforms to the 802.11b standard. Because the received signal 206 is one of the high rate signals 134 and one of the received signals 122, detecting whether the received signal 206 conforms to the 802.11b standard also detects whether the high rate signals 134 and the received signals 122 conform to the 802.11b standard. If the received signal 206 conforms to the 802.11b standard, the carrier detect circuit 204 may provide the detection signal 126 to the latch 118 as a latching signal.

Figure 3:
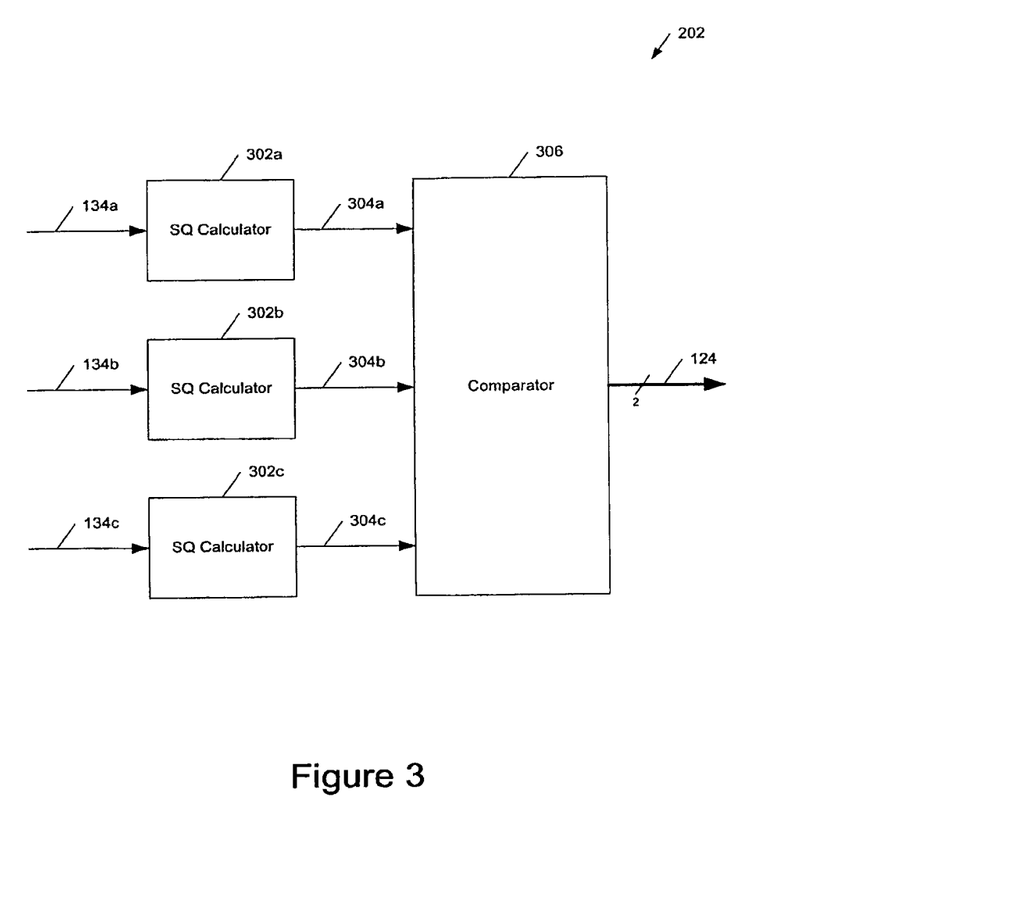
FIG. 3 is a block diagram of an embodiment of a carrier sense datapath of the carrier sense circuit of FIG. 2.

FIG. 3 is a block diagram of an embodiment of a carrier sense datapath 202 of the carrier sense circuit 116. The carrier sense datapath 202 may include signal quality calculators 302*a-c* and a comparator 306. The signal quality calculators 302*a-c* may receive the high rate signals 134*a-c* as inputs. The comparator 306 may receive signal qualities 304*a-c* and may output the selection signal 124. Additional or different components may also be included in the carrier sense datapath 202. FIG. 3 shows three incoming high rate signals 134*a-c* but more or less incoming signals may be used. The carrier sense datapath 202, as described above, may calculate a signal metric for each of the high rate signals 134 and may generate the selection signal 124 denoting which of the high rate signals 134 has the best metric.

A signal quality 304*a-c* for each of the high rate signals 134*a-c* may be used as the signal metric, as described previously. The signal quality calculators 302*a-c* may calculate the signal quality 304*a-c* for each of the high rate signals 134*a-c*. The signal quality 304*a-c* may be based on a peak magnitude and a delay dispersion, and may be calculated by:

$$SQ \approx c_0 \frac{\|h_{peak}\|}{\sum_{t \in T_s} \|h_t\| - 2\|h_{peak}\|} \quad (1)$$

where $c_0$ is a coefficient, $h_t$ is one of the time-varying high rate signals 134*a-c*, $\|h_t\|$ is the magnitude of $h_t$, and $$\|h_{peak}\| = \max_t \|h_t\|$$

is the peak magnitude of the received signal. For example, if $h_t$ represents the high rate signal 134*a*, the signal quality in equation (1) is the signal quality 304a for the first RF signal. Other parameters and equations may be used to calculate a signal quality for the high rate signals 134a-c.

The signal qualities 304a-c may be provided to the comparator 306. The comparator 306 may compare the signal qualities 304a-c to determine the best signal quality. The best signal quality in FIG. 3 may be the one with the highest ratio of the peak magnitude over delay dispersions, as specified in equation (1). Based on the best signal quality, the comparator 306 may encode the selection signal 124 to denote which one the high rate signals 134a-c has the best signal quality. For example, if the second signal 134b of the high rate signals 134a-c has the best signal quality, the selection signal 124 may comprise the two bits "01".

Figure 4:
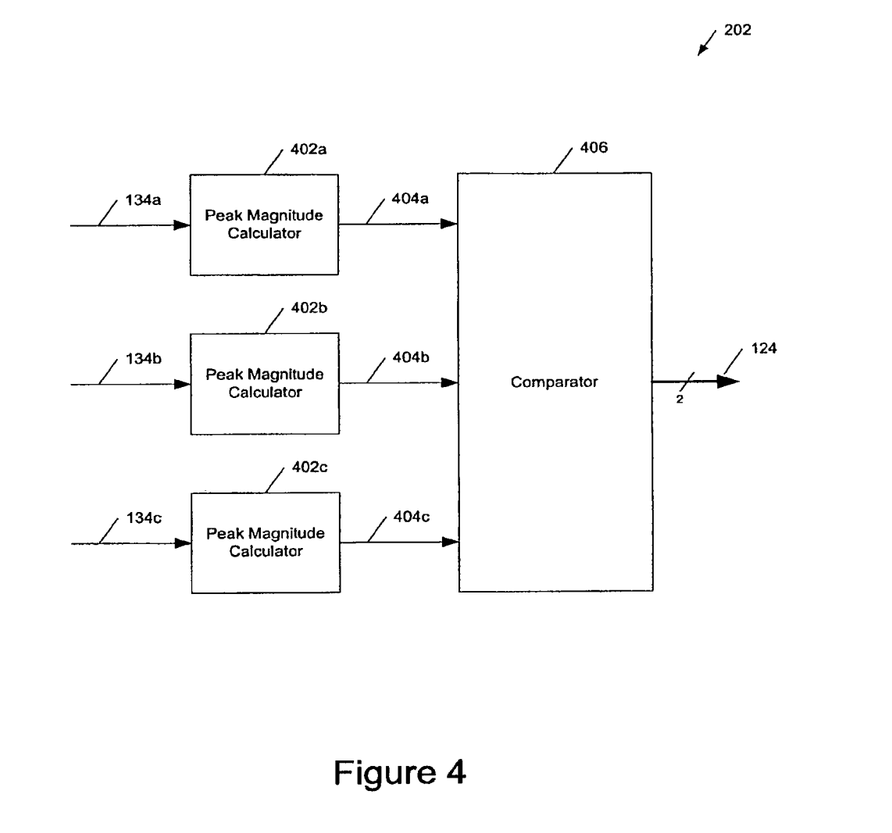
FIG. 4 is a block diagram of an alternative embodiment of a carrier sense datapath of the carrier sense circuit of FIG. 2.

FIG. 4 is a block diagram of an alternative embodiment of a carrier sense datapath 202 of the carrier sense circuit 116. The carrier sense datapath 202 in this alternative embodiment may include peak magnitude calculators 402a-c and a comparator 406. The peak magnitude calculators 402a-c may receive the high rate signals 134a-c as inputs, and calculate the peak magnitude $$\|h_{peak}\| = \max_{t} \|h_t\|$$

for each of the high rate signals 134a-c. The comparator 406 may receive peak magnitudes 404a-c, calculate the highest magnitude $\max\|h_{peak}\|$ over the peak magnitudes 404a-c, and output the selection signal 124. Additional or different components may also be included in the carrier sense datapath 202. FIG. 4 shows three incoming high rate signals 134a-c but more or less incoming signals may be used. The carrier sense datapath 202, as described above, may calculate a signal metric for each of the high rate signals 134 and may generate the selection signal 124 denoting which of the high rate signals 134 has the best metric.

A peak magnitude $\|h_{peak}\|$ 404a-c for each of the high rate signals 134a-c may be used as the signal metric, as described previously. The peak magnitude calculators 402a-c may calculate the peak magnitude 404a-c for each of the high rate signals 134a-c. The peak magnitude 404a-c may be measured by any logic or circuit which can detect the highest magnitude of each of the high rate signals 134a-c. The peak magnitudes 404a-c may be provided to the comparator 406. The comparator 406 may compare the peak magnitudes 404a-c to determine the highest of the peak magnitudes 404a-c. Based on the highest peak magnitude, the comparator 406 may encode the selection signal 124 to denote which one the high rate signals 134a-c has the highest peak magnitude. For example, if the first signal 134a of the high rate signals 134a-c is found to have the highest peak magnitude, the selection signal 124 may comprise the two bits "00".

Figure 5:
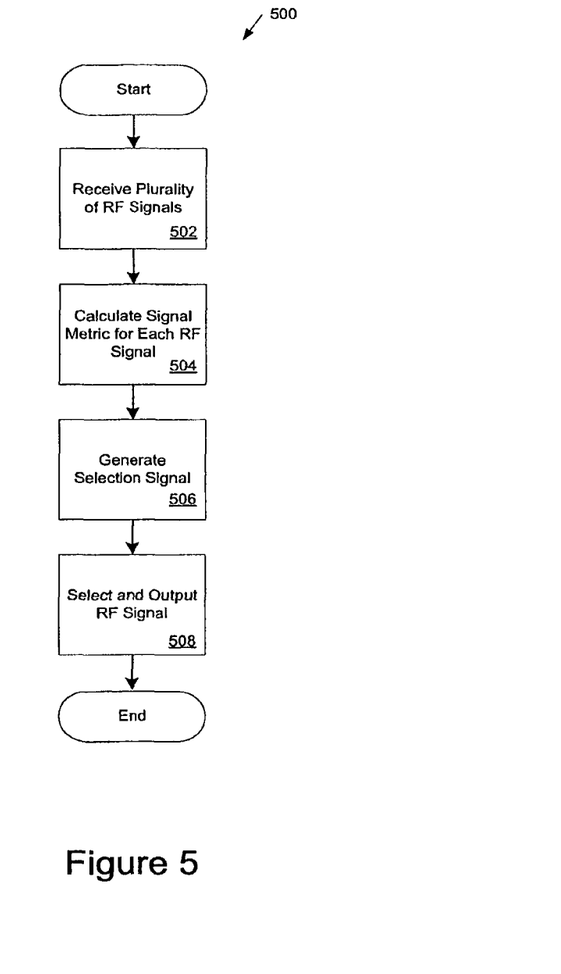
FIG. 5 is a flowchart that represents a method of an embodiment of the wireless networking receiver.

FIG. 5 is a flowchart that represents a method 500 of an embodiment of the wireless networking receiver 100. A plurality of RF signals conforming to the 802.11b standard may be received in Step 502. A plurality of antennas in a receiver 100 designed primarily for use with the 802.11n standard may each receive one of the plurality of RF signals. The plurality of RF signals may be converted to digital signals for processing in a digital system. In Step 504, a signal metric may be calculated for each of the plurality of received RF signals. The signal metric may be a signal quality, a peak magnitude, or other metric. A selection signal may be generated in Step 506, based on the signal metric. The selection signal denotes which of the plurality of received RF signals has the best signal metric. For example, the best signal metric may be the highest signal quality, the highest peak magnitude, or other measure of a metric. In Step 508, one of the plurality of RF signals may be selected and output, based on the selection signal from Step 506. The one of the plurality of RF signals may be provided to a downstream datapath or other logic for further processing.

Figure 6A:
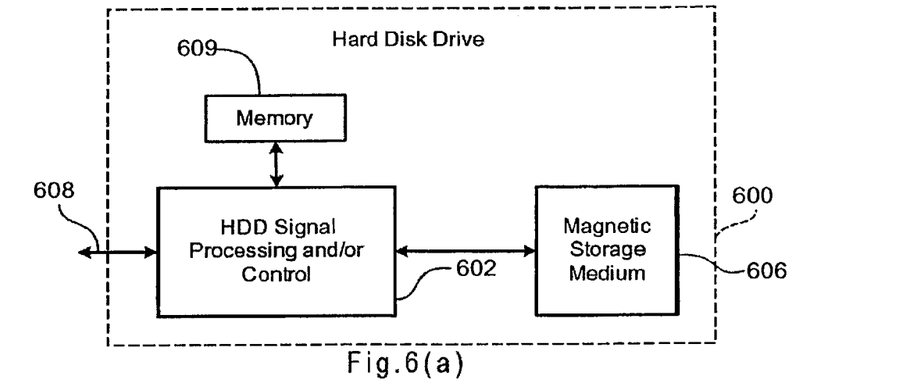

Referring now to FIGS. 6(a) to 6(h), various exemplary implementations of the present invention are shown. Referring to FIG. 6(a), the present invention may be embodied in a hard disk drive (HDD) 600. HDD 600 may communicate with a host device (not shown) such as a computer, mobile computing devices such as personal digital assistants, cellular phones, media or MP3 players and the like, and/or other devices via one or more wired or wireless communication links 608.

The present invention may be implemented with either or both signal processing and/or control circuits, which are generally identified in FIG. 6(a) at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606. HDD 600 may be connected to memory 609, such as random access memory (RAM), a low latency nonvolatile memory such as flash memory, read only memory (ROM) and/or other suitable electronic data storage.

Figure 6B:
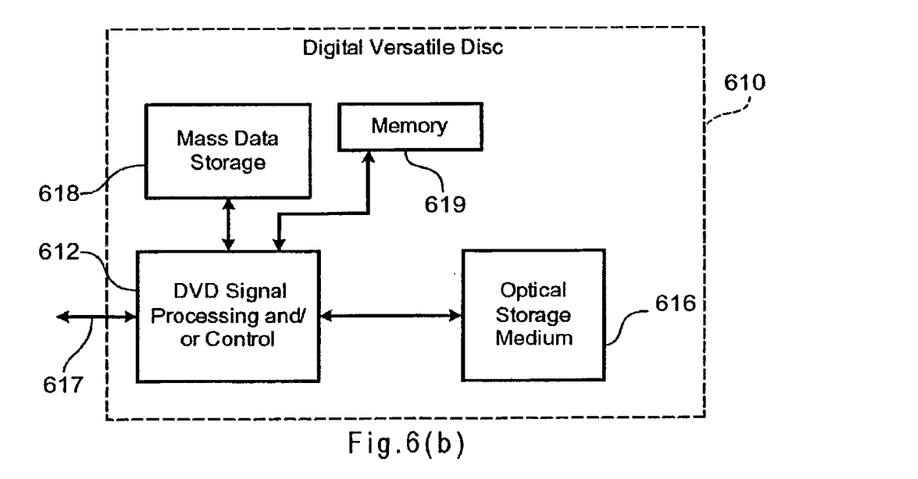

Referring now to FIG. 6(b), the present invention may be implemented in a digital versatile disc (DVD) drive 610. The present invention may be implemented in either or both signal processing and/or control circuits, which are generally identified in FIG. 6(b) at 612, and/or mass data storage 618 of DVD drive 610. Signal processing and/or control circuit 612 and/or other circuits (not shown) in DVD drive 610 may process data, perform coding and/or encryption, perform calculations, and/or format data that is read from and/or data written to an optical storage medium 616. In some implementations, signal processing and/or control circuit 612 and/or other circuits (not shown) in DVD drive 610 can also perform other functions such as encoding and/or decoding and/or any other signal processing functions associated with a DVD drive.

DVD drive 610 may communicate with a device (not shown) such as a computer, television or other device via one or more wired or wireless communication links 617. DVD drive 610 may communicate with mass data storage 618 that stores data in a nonvolatile manner. Mass data storage 618 may include a HDD such as that shown in FIG. 6(a). The HDD may be a mini HDD that includes one or more platters having a diameter that is smaller than approximately 1.8". DVD drive 610 may be connected to memory 619, such as RAM, ROM, low latency nonvolatile memory such as flash memory, and/or other suitable electronic data storage.

Figure 6C:
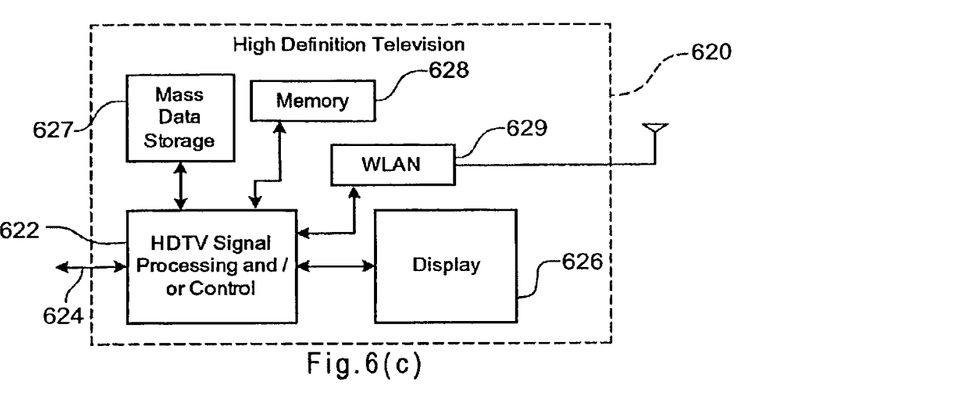

Referring now to FIG. 6(c), the present invention may be embodied in a high definition television (HDTV) 620. The present invention may be implemented in either or both signal processing and/or control circuits, which are generally identified in FIG. 6(c) at 622, a WLAN interface 629 and/or mass data storage 627 of the HDTV 620. HDTV 620 may receive HDTV input signals in either a wired or wireless format via one or more wired or wireless communication links 624 and generate HDTV output signals for a display 626. In some implementations, signal processing circuit and/or control circuit 622 and/or other circuits (not shown) of HDTV 620 may process data, perform coding and/or encryption, perform calculations, format data and/or perform any other type of HDTV processing that may be required.

HDTV 620 may communicate with mass data storage 627 that stores data in a nonvolatile manner such as optical and/or magnetic storage devices. At least one HDD may have the configuration shown in either FIG. 6(*a*) and/or at least one DVD may have the configuration shown in FIG. 6(*b*). The HDD may be a mini HDD that includes one or more platters having a diameter that is smaller than approximately 1.8". HDTV 620 may be connected to memory 628 such as RAM, ROM, low latency nonvolatile memory such as flash memory and/or other suitable electronic data storage. HDTV 620 also may support connections with a WLAN via a WLAN network interface 629.

Referring now to FIG. 6(*d*), the present invention may be implemented in a control system of a vehicle 630, a WLAN interface 648 and/or mass data storage 646 of the vehicle control system. In some implementations, the present invention is implemented in a power-train control system 632 that receives inputs from one or more sensors 636 such as temperature sensors, pressure sensors, rotational sensors, airflow sensors and/or any other suitable sensors and/or that generates one or more output control signals such as engine operating parameters, transmission operating parameters, and/or other control signals at one or more output(s) 638.

Figure 6D:
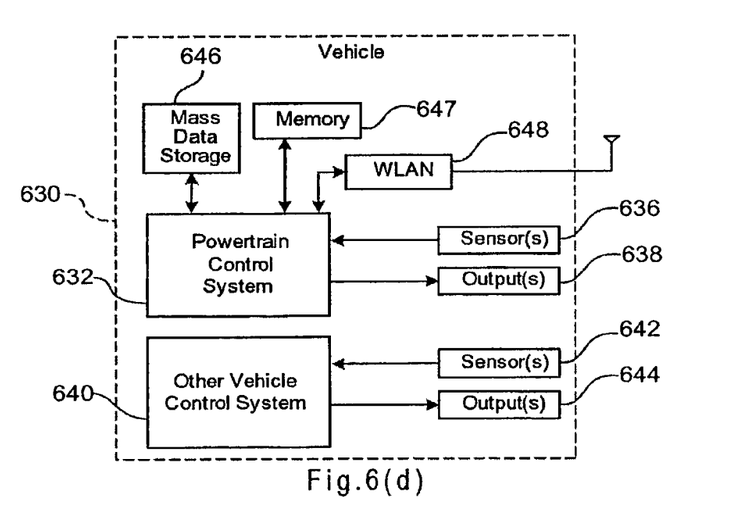

The present invention may also be embodied in other control systems 640 of vehicle 630. Control system 640 may likewise receive signals from input sensors 642 and/or output control signals to one or more output(s) 644. In some implementations, control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 632 may communicate with mass data storage 646 that stores data in a nonvolatile manner. Mass data storage 646 may include optical and/or magnetic storage devices, for example HDDs and/or DVDs. At least one HDD may have the configuration shown in FIG. 6(*a*) and/or at least one DVD may have the configuration shown in FIG. 6(*b*). The HDD may be a mini HDD that includes one or more platters having a diameter that is smaller than approximately 1.8". Powertrain control system 632 may be connected to memory 647 such as RAM, ROM, low latency nonvolatile memory such as flash memory and/or other suitable electronic data storage. Powertrain control system 632 also may support connections with a WLAN via a WLAN network interface 648. The control system 640 may also include mass data storage, memory and/or a WLAN interface (all not shown).

Referring now to FIG. 6(*e*), the present invention may be embodied in a cellular phone 650 that may include a cellular antenna 651. The present invention may be implemented in either or both signal processing and/or control circuits, which are generally identified in FIG. 6(*e*) at 652, a WLAN interface and/or mass data storage of the cellular phone 650. In some implementations, cellular phone 650 includes a microphone 656, an audio output 658 such as a speaker and/or audio output jack, a display 660 and/or an input device 662 such as a keypad, pointing device, voice actuation and/or other input device. Signal processing and/or control circuits 652 and/or other circuits (not shown) in cellular phone 650 may process data, perform coding and/or encryption, perform calculations, format data and/or perform other cellular phone functions.

Figure 6E:
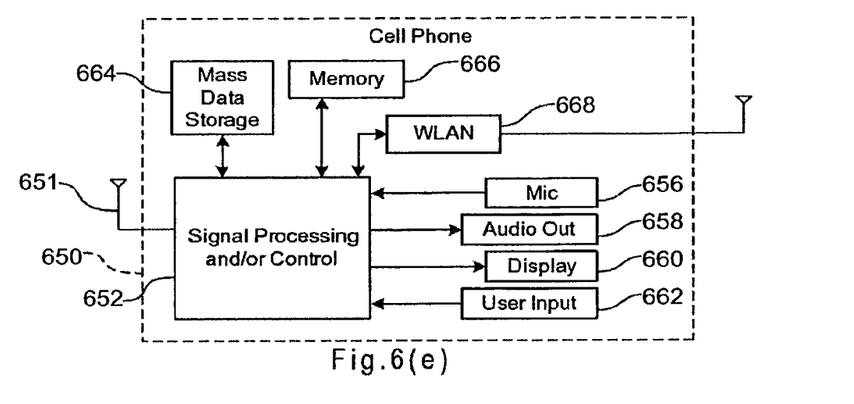

Cellular phone 650 may communicate with mass data storage 664 that stores data in a nonvolatile manner such as optical and/or magnetic storage devices, for example HDDs and/or DVDs. At least one HDD may have a configuration shown in FIG. 6(*a*) and/or at least one DVD may have the configuration shown in FIG. 6(*b*). The HDD may be a mini HDD that includes one or more platters having a diameter that is smaller than approximately 1.8". Cellular phone 650 may be connected to memory 666 such as RAM, ROM, low latency nonvolatile memory such as flash memory and/or other suitable electronic data storage. Cellular phone 650 also may support connections with a WLAN via a WLAN network interface 668.

Referring now to FIG. 6(*f*), the present invention may be embodied in a set top box 680. The present invention may be implemented in either or both signal processing and/or control circuits, which are generally identified in FIG. 6(*f*) at 684, a WLAN interface and/or mass data storage of the set top box 680. Set top box 680 receives signals from a source such as a broadband source and outputs standard and/or high definition audio/video signals suitable for a display 688 such as a television and/or monitor and/or other video and/or audio output devices. Signal processing and/or control circuits 684 and/or other circuits (not shown) of the set top box 680 may process data, perform coding and/or encryption, perform calculations, format data and/or perform any other set top box function.

Figure 6F:
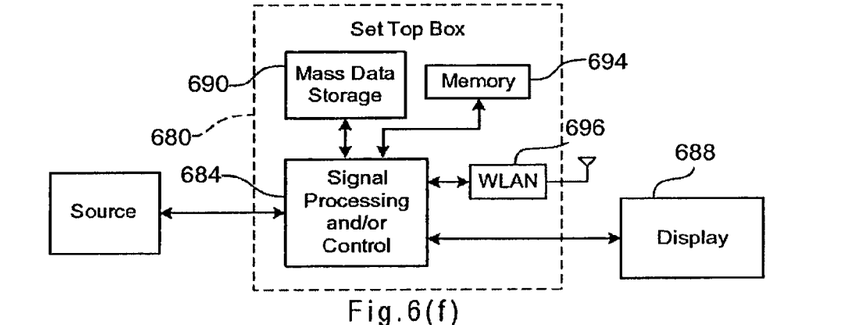

Set top box 680 may communicate with mass data storage 690 that stores data in a nonvolatile manner. Mass data storage 690 may include optical and/or magnetic storage devices, for example HDDs and/or DVDs. At least one HDD may have a configuration shown in FIG. 6(*a*) and/or at least one DVD may have the configuration shown in FIG. 6(*b*). The HDD may be a mini HDD that includes one or more platters having a diameter that is smaller than approximately 1.8". Set top box 680 may be connected to memory 694 such as RAM, ROM, low latency nonvolatile memory such as flash memory and/or other suitable electronic data storage. Set top box 680 also may support connections with a WLAN via a WLAN network interface 696.

Referring now to FIG. 6(*g*), the present invention may be embodied in a media player 700. The present invention may be implemented in either or both signal processing and/or control circuits, which are generally identified in FIG. 6(*g*) at 704, a WLAN interface and/or mass data storage of the media player 700. In some implementations, media player 700 includes a display 707 and/or a user input 708 such as a keypad, touchpad and the like. In some implementations, media player 700 may employ a graphical user interface (GUI) that typically employs menus, drop down menus, icons and/or a point-and-click interface via display 707 and/or user input 708. Media player 700 further includes an audio output 709 such as a speaker and/or audio output jack. Signal processing and/or control circuits 704 and/or other circuits (not shown) of media player 700 may process data, perform coding and/or encryption, perform calculations, format data and/or perform any other media player function.

Figure 6G:
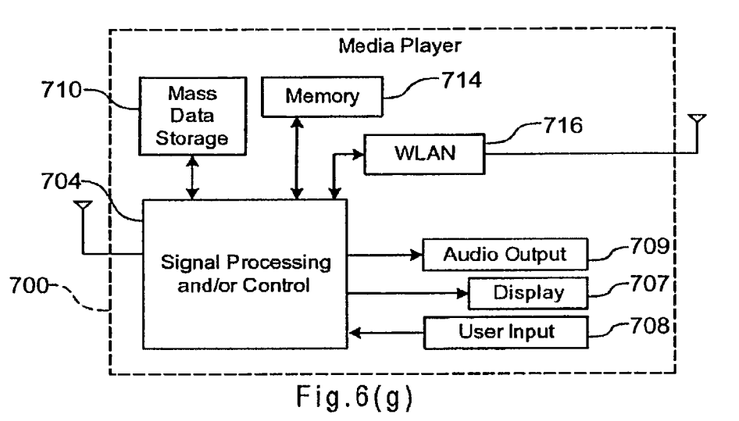

Media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage 710 may include optical and/or magnetic storage devices, for example HDDs and/or DVDs. At least one HDD may have a configuration shown in FIG. 6(*a*) and/or at least one DVD may have the configuration shown in FIG. 6(*b*). The HDD may be a mini HDD that includes one or more platters having a diameter that is smaller than approximately 1.8".

Media player 700 may be connected to memory 714 such as RAM, ROM, low latency nonvolatile memory such as flash memory and/or other suitable electronic data storage. Media player 700 also may support connections with a WLAN via a WLAN network interface 716. Still other implementations in addition to those described above are contemplated.

Referring to FIG. 6(*h*), the present invention may be embodied in a Voice over Internet Protocol (VoIP) phone 750 that may include an antenna 718. The present invention may be implemented in either or both signal processing and/or control circuits, which are generally identified in FIG. 6(*h*) at 720, a wireless interface and/or mass data storage of the VoIP phone 750. In some implementations, VoIP phone 750 includes, in part, a microphone 724, an audio output 726 such as a speaker and/or audio output jack, a display monitor 728, an input device 730 such as a keypad, pointing device, voice actuation and/or other input devices, and a Wi-Fi communication module 732. Signal processing and/or control circuits 720 and/or other circuits (not shown) in VoIP phone 750 may process data, perform coding and/or encryption, perform calculations, format data and/or perform other VoIP phone functions.

Figure 6H:
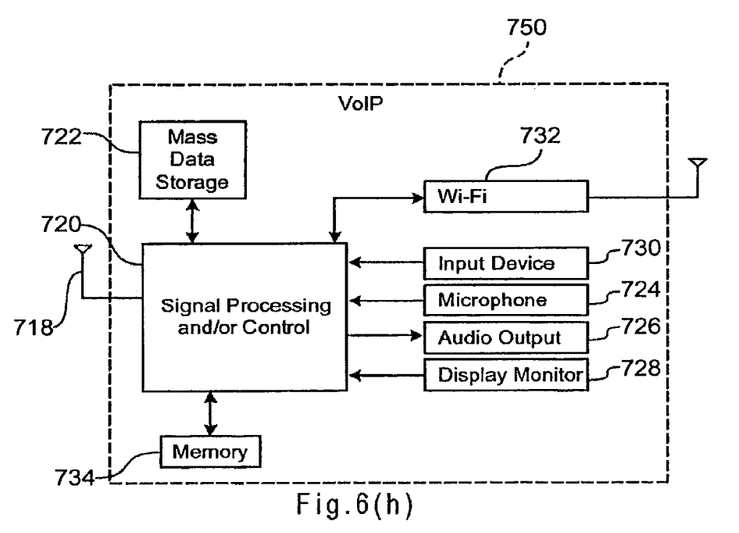

VoIP phone 750 may communicate with mass data storage 722 that stores data in a nonvolatile manner such as optical and/or magnetic storage devices, for example HDDs and/or DVDs. At least one HDD may have a configuration shown in FIG. 6(*a*) and/or at least one DVD may have the configuration shown in FIG. 6(*b*). The HDD may be a mini HDD that includes one or more platters having a diameter that is smaller than approximately 1.8". VoIP phone 750 may be connected to memory 734, which may be a RAM, ROM, low latency nonvolatile memory such as flash memory and/or other suitable electronic data storage. VoIP phone 750 is configured to establish communications link with a VoIP network (not shown) via Wi-Fi communication module 732.

All of the discussion above, regardless of the particular implementation being described, is exemplary in nature, rather than limiting. Although specific components of the signal metric based receive selection system are described, methods, systems, and articles of manufacture consistent with the signal metric based receive selection system may include additional or different components. For example, components of the signal metric based receive selection system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the signal metric based receive selection system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

What is claimed is:

1. A wireless networking receiver, comprising:
first circuitry configured to:
receive a plurality of radio frequency (RF) signals; and
if a data rate of each of the plurality of RF signals meets a predetermined data rate, send each of the plurality of RF signals to a datapath;
a carrier sense circuit, coupled to the datapath and configured to calculate a signal metric for each of the plurality of received RF signals on the datapath and generate, based on the signal metric, a selection signal signifying one of the plurality of received RF signals on the datapath; and
second circuitry coupled to the datapath and configured to output the one of the plurality of received RF signals based on the selection signal.

2. The receiver of claim 1, wherein the datapath is a high rate datapath.

3. The receiver of claim 2, further comprising a low rate data path and wherein if each of the plurality of RF signals does not satisfy a minimum data rate, the first circuit sends the plurality of received RF signals to the low rate datapath.

4. The receiver of claim 1, wherein the signal metric comprises a signal quality; and the carrier sense circuit is further configured to generate the selection signal signifying the one of the plurality of received RF signals with a highest signal quality.

5. The receiver of claim 1, wherein the signal metric comprises a signal quality that is based on a measurement of a peak magnitude and a delay dispersion.

6. The receiver of claim 4, wherein the highest signal quality comprises a highest ratio of a peak magnitude over delay dispersions.

7. The receiver of claim 1, wherein the signal metric comprises a peak magnitude; and the carrier sense circuit is further configured to generate the selection signal signifying the one of the plurality of received RF signals with a highest peak magnitude.

8. The receiver of claim 2, wherein the carrier sense circuit comprises:
a signal metric calculator configured to calculate the signal metric for each of the plurality of received RF signals sent to the high rate datapath; and
a comparator configured to compare the signal metric for each of the plurality of received RF signals sent to the high rate datapath and generate, based on the comparison, the selection signal signifying the one of the plurality of received RF signals sent to the high rate datapath.

9. The receiver of claim 1, wherein the wireless networking receiver conforms to IEEE 802.11n or 802.11b and wherein plurality of RF signals comprise signals conforming to IEEE 802.11n or 802.11b.

10. The receiver of claim 9, further comprising a signal detection circuit configured to detect from the plurality of received RF signals a signal conforming to the IEEE 802.11b standard and generate a detection signal denoting a presence of the signal conforming to the IEEE 802.11b standard in the plurality of received RF signals.

11. The receiver of claim 10, wherein the selection signal is latched when the detection signal is active.

12. The receiver of claim 1, wherein each of the plurality of RF signals comprises an RF signal in a 2.4 GHz frequency band operating at a data rate of approximately 1, 2, 5.5, or 11 megabits per second.

13. The receiver of claim 3, wherein the first circuitry comprises a demultiplexer and the second circuit comprises a multiplexer.

14. A method of selecting a radio frequency signal, comprising:
  receiving, with first circuitry, a plurality of RF signals;
  if a data rate of each of the plurality of RF signals meets a predetermined data rate, sending each of the plurality of RF signals to a datapath;
  calculating a signal metric for each of the plurality of RF signals on the datapath;
  generating, based on the signal metric, a selection signal signifying one of the plurality of RF signals on the datapath; and
  outputting, from second circuitry, the one of the plurality of received RF signals on the datapath based on the selection signal.

15. The method of claim 14, wherein the datapath is a high rate datapath.

16. The method of claim 14, wherein if the data rate of each of the plurality of RF signals does not meet the predetermined data rate, sending, with the first circuitry, each of the plurality of received RF signals to a low rate datapath.

17. The method of claim 14, wherein the signal metric comprises a signal quality; and
  wherein the method further comprises: generating the selection signal signifying the one of the plurality of received RF signals with a highest signal quality.

18. The method of claim 15, wherein generating the selection signal comprises:
  comparing the signal metric for each of the plurality of received RF signals on the high rate datapath; and
  generating the selection signal signifying one of the received RF signals on the high rate datapath, based on the comparison.

19. The method of claim 16, wherein the plurality of RF signals comprise signals conforming to IEEE 802.11b or 802.11n and further comprising:
  detecting from the plurality of received RF signals a signal conforming to the IEEE 802.11b standard; and
  generating a detection signal denoting a presence of the signal conforming to the IEEE 802.11b or 802.11n standard in the plurality of received RF signals.

20. The method of claim 19, further comprising latching the selection signal when the detection signal is generated.

* * * * *